United States Patent [19]

Nishide et al.

[11] Patent Number: 5,692,805
[45] Date of Patent: Dec. 2, 1997

[54] PRELOADER APPARATUS

[75] Inventors: Seiji Nishide; Hideki Tanaka; Kenji Matsui, all of Aichi-ken, Japan

[73] Assignee: Kabushiki Kaisha Tokai-Rika-Denki-Seisakusho, Aichi-Ken, Japan

[21] Appl. No.: 550,103

[22] Filed: Oct. 30, 1995

[30] Foreign Application Priority Data

Nov. 8, 1994 [JP] Japan .................. 6-274036

[51] Int. Cl.$^6$ .................. B60R 22/46
[52] U.S. Cl. .................. 297/472; 297/480; 280/806
[58] Field of Search .................. 297/472, 479, 297/480; 280/806

[56] References Cited

U.S. PATENT DOCUMENTS

| | | | |
|---|---|---|---|
| 4,441,738 | 4/1984 | Tsuge et al. | 280/806 |
| 4,585,184 | 4/1986 | Kawaguchi et al. | 280/806 X |
| 5,344,096 | 9/1994 | Frei et al. | 280/806 X |
| 5,480,190 | 1/1996 | Fohl | 297/480 X |
| 5,568,940 | 10/1996 | Lane, Jr. | 297/480 X |

FOREIGN PATENT DOCUMENTS

| | | |
|---|---|---|
| 655371 | 5/1995 | European Pat. Off. . |
| 2304878 | 8/1974 | Germany . |
| 2518710 | 11/1976 | Germany . |
| 3734152 | 4/1989 | Germany . |
| 9102410 | 6/1991 | Germany . |
| 9104917 | 8/1991 | Germany . |
| 9108781 | 12/1991 | Germany . |
| 4226083 | 2/1994 | Germany . |
| 63-287643 | 5/1988 | Japan . |
| 1168547 | 7/1989 | Japan . |
| 357166 | 5/1991 | Japan . |
| 481855 | 7/1992 | Japan . |
| 542013 | 8/1993 | Japan . |
| 5270358 | 10/1993 | Japan . |
| 2265814 | 10/1993 | United Kingdom . |

*Primary Examiner*—Peter R. Brown
*Attorney, Agent, or Firm*—Sixbey Friedman Leedom & Ferguson; Thomas W. Cole

[57] ABSTRACT

A preloader apparatus which retracts a buckle upon quick deceleration of a vehicle to tighten a webbing, and then restores the buckle to a position of ordinary vehicle running, to contemplate the improvement in operability of an operation button. The buckle is retracted upon quick deceleration of a vehicle from an ordinary protracted position to a retracted position through wires wound around a drum. After that, when a buckle-retracting force decreases and becomes smaller than a buckle-protracting force, a force F corresponding to a difference between the both acts on a projection, and the projection is broken. Although a meshing portion of a pawl meshes with an external tooth of an external gear to prevent the external gear from rotation in a direction of buckle protraction, the breakage allows the drum to rotate in the direction of buckle protraction, and the buckle can be restored to the protracted position. Projections abut against a stopper at the protracted position, and the buckle is prevented from further protraction.

17 Claims, 11 Drawing Sheets

PRELOADER APPARATUS

BACKGROUND OF THE INVENTION

1. Field of the Invention

The present invention relates to a preloader apparatus for retracting a buckle to tighten a webbing upon quick deceleration of a vehicle.

2. Description of the Prior Art

In the conventional seat belt unit for vehicles, a webbing is installed by engaging a tongue plate through which an intermediate portion of the webbing is inserted with a buckle beside a seat. In order to release the installation of the webbing, a cancel button provided on the buckle is operated to cancel the engagement between the tongue plate and the buckle.

Such a preloader apparatus retracts the buckle from an ordinary position upon emergency of the vehicle so that the webbing is tightened to enhance initial restriction of a passenger. When the buckle is retracted, a lock mechanism operates, and the buckle is held at its retracted position and prevented from protraction.

In such a preloader apparatus, the cancel button is located at different positions as the buckle is located at a retracted position or an ordinary position. Therefore, when a passenger desires to rapidly cancel the installation of the webbing, the operability to cancel the webbing installation is deteriorated because the position of the cancel button changes.

In order to solve this problem, Japanese Utility Model Laid-open No. 4-81855 discloses an electronic preloader apparatus.

As shown in FIG. 10, this preloader apparatus is constructed such that a buckle 103 of a seat belt is retractable from a predetermined position. This preloader apparatuses includes a first cancelable solenoid unit 111 for locking the buckle 103 at a predetermined position, a tensile spring 119 for instantly retracting the buckle 103 when the first solenoid unit 111 is canceled, a second cancelable solenoid unit 121 for locking the retracted buckle 103 at a predetermined retracted position, and a motor 123 which can move the buckle 103 to a predetermined position when the second solenoid unit 121 is canceled. By using this preloader apparatus, the buckle 103 can be returned to a position of ordinary vehicle running because the motor which can move the buckle 103 to the predetermined position is provided.

However, this preloader apparatus uses many electronic parts for a circuit to make the aforementioned control and for an actuator. Accordingly, a simpler mechanical preloader apparatus has been demanded.

Japanese Utility Model Laid-open No. 5-42013 assigned by the present applicant discloses a technique of a mechanical preloader apparatus.

As shown in FIG. 11, a slide plate 116 to which a buckle 114 is secured is connected to a wire 128 which is connected to a wire 170 to which a rack 168 is secured. A slide case 154 by which a cam 156 is rotatably supported is secured to an arm 152 which rotates together with a seat back 113. A trigger shaft 178 engages with a stopper 132, and the buckle 114 is located at an ordinary position. After the buckle 114 is retracted toward a base plate 112, the buckle 114 is restored to the ordinary position by declining the seat back 113 frontwardly in the vehicle. Thus the cam 156 engages with the rack 168, the rack 168 moves in a direction of an arrow A in FIG. 11, the trigger shaft 178 engages with the stopper 132, and the buckle 114 is restored to the ordinary position.

However, this mechanical preloader apparatus requires many mechanical parts because it aims to be reused. Therefore, a simpler mechanical preloader apparatus has been demanded.

Techniques relevant to the present invention are those described in Japanese Patent Laid-open Nos. 63-287643, 5-270358, Japanese Utility Model Laid-Open No. 3-57166, and Japanese Patent Application Publication No. 7-5061.

SUMMARY OF THE INVENTION

Taking the aforementioned facts into consideration, it is an object of the present invention to provide a preloader apparatus having a simple structure which retracts a buckle upon quick deceleration of a vehicle to tighten a webbing, and then restores the buckle to an ordinary position, to make it possible to contemplate the improvement in operability of an operation button.

The present invention lies in a preloader apparatus for retracting a buckle from an ordinary protracted position to a retracted position for tightening a webbing, the buckle having an engaging portion for engaging with a tongue plate for attaching and detaching the webbing, and a cancel operation portion for canceling the engagement, the preloader apparatus comprising a brittle portion which prevents the buckle from being protracted by opposing a buckle-protracting force after the buckle is retracted to the retracted position and before the buckle-protracting force arrives at a predetermined force, and which is broken after the buckle-protracting force arrives at the predetermined force to permit the buckle to be protracted.

According to the present invention, the tongue plate is engaged with the engaging portion of the buckle to install the webbing. In order to cancel the installation of the webbing, the cancel operation portion may be operated to cancel the engagement between the tongue plate and the engaging portion of the buckle.

The buckle is retracted from the ordinary protracted position to the retracted position upon quick deceleration of a vehicle, and the webbing is tightened.

After that, when the buckle-retracting force decreases and becomes smaller than the buckle-protracting force, a force corresponding to a difference between the both acts on the brittle portion. Before the force acting on the brittle portion arrives at a predetermined force, the brittle portion opposes the force to prevent the buckle from being protracted. When the force acting on the brittle portion arrives at the predetermined force, the brittle portion is broken, and the buckle can be protracted. Thus the buckle can be restored to the protracted position.

The webbing can be tightened by retracting the buckle upon quick deceleration of a vehicle as described above. Accordingly, it is possible to ensure initial restriction of a passenger by using the webbing upon quick deceleration of a vehicle. After that, the buckle is restored to the ordinary position to allow the cancel operation portion to be operated at the same position as that in the ordinary state. Thus it is possible to contemplate the improvement in operability of the cancel operation portion.

In this arrangement, a prohibiting means may be further provided for prohibiting further protraction at the protracted position of the buckle. By doing so, the buckle is prevented from being further protracted at the protracted position by the prohibiting means.

The brittle portion may be constructed by a connecting portion between a moving member and an operating member. By doing so, when the moving member moves in one direction upon quick deceleration of a vehicle to retract the buckle, a lock member engages with the operating member to prevent the operating member from moving in an opposite direction. The moving member is prevented from moving in the opposite direction until the brittle portion is broken. Thus the buckle is prevented from being protracted. When the brittle portion is broken, the moving member can move in the opposite direction although the operating member is prevented from moving in the opposite direction by the lock member. Thus the buckle can be protracted.

The brittle portion may be constructed by an engaging portion between an operating member and a lock member. By doing so, the operating member is prevented from moving in an opposite direction until the brittle portion is broken. Therefore, a moving member is prevented from moving in the opposite direction, and the buckle is prevented from being protracted. When the brittle portion is broken, the engagement between the operating member and the lock member is canceled, and the operating member can move in the opposite direction because the lock member cannot prevent the operating member from moving in the opposite direction. Thus the moving member can move in the opposite direction, and the buckle can be protracted.

BRIEF DESCRIPTION OF THE DRAWINGS

In the accompanying drawings.

DESCRIPTION OF THE PREFERRED EMBODIMENTS

First Embodiment

A first embodiment of the preloader apparatus according to the invention will be explained with reference to FIGS.

1–6. Arrows FR, W, and UP optionally depicted in each of the drawings indicate frontward, widthwise, and upward directions for a vehicle, respectively (likewise in a second embodiment).

Figure 6:
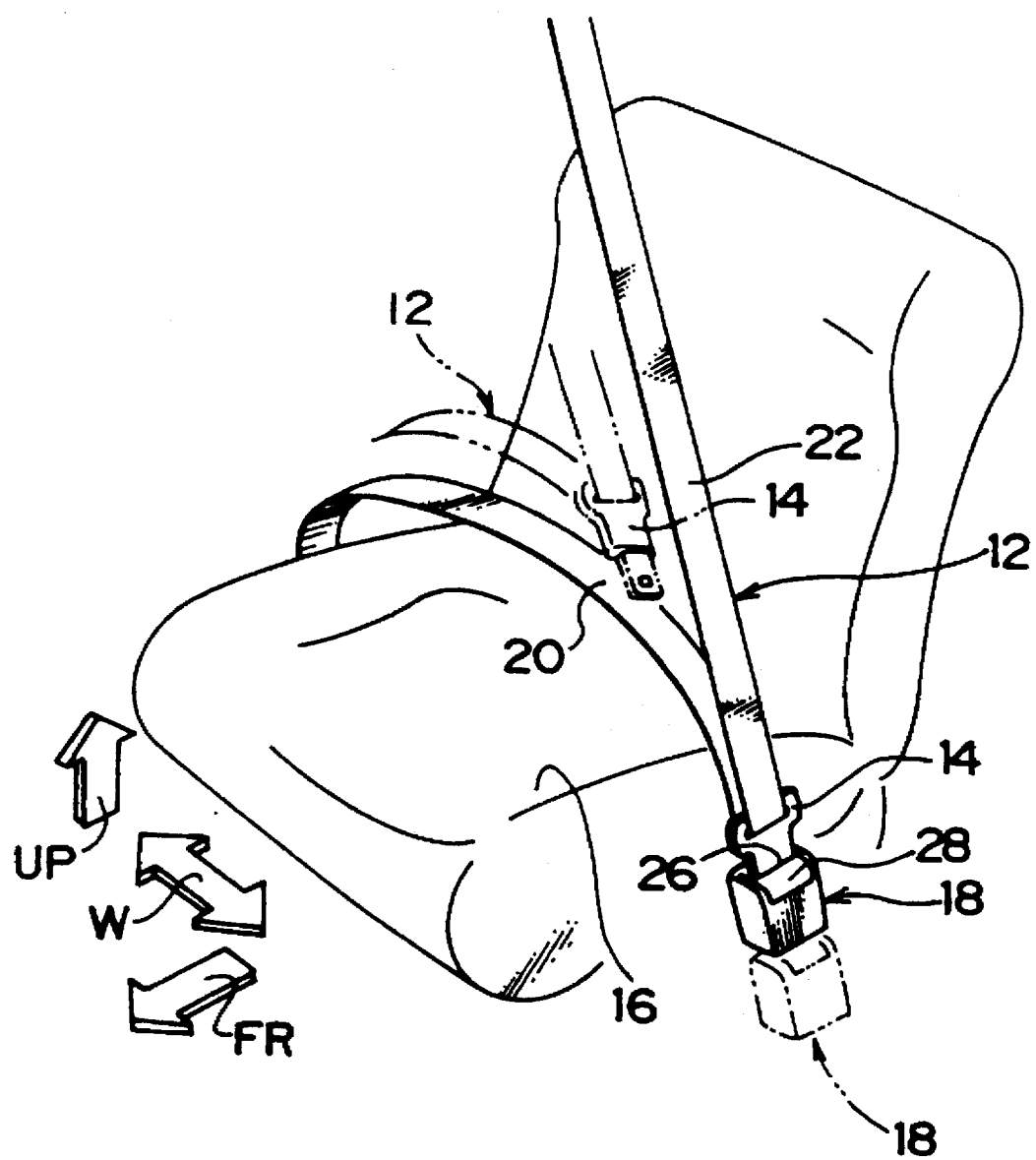
FIG. 6 is a perspective view showing a seat belt unit to which the preloader apparatus of the first embodiment is applied.

As shown in FIG. 6, a seat belt unit of a vehicle includes a webbing 12 with its one end which is wound by an unillustrated winding unit. The other end of the webbing 12 is supported by an unillustrated outer anchor located on a right side beside a seat 16. The webbing 12 has its intermediate portion which passes through an unillustrated shoulder anchor located on a side wall of the vehicle. A tongue plate 14 is inserted and supported between the unillustrated shoulder anchor and the unillustrated outer anchor. The tongue plate 14 shown by two-dot chain lines is inserted into a tongue plate insertion hole 26 of a buckle 18 located on a left side beside the seat 16 shown by solid lines to make engagement. This seat belt unit is one of those of the three-point type.

A passenger wears the webbing 12 during an ordinary running state of the vehicle by using the webbing 12 between the unillustrated outer anchor and the tongue plate 14 as a lap webbing 20, and using the webbing 12 between the tongue plate 14 and the shoulder anchor as a shoulder webbing 22. The buckle 18 is provided with an engaging portion (for example, a latch fixture urged by a plate spring) for engaging with the tongue plate 14, as well as a cancel button 28 as a cancel operation portion. When the cancel button 28 is depressed, the engagement between the tongue plate 14 and the buckle 18 is canceled. Thus a passenger can cancel the wearing of the webbing 12.

Upon quick deceleration of the vehicle, the buckle 18 is retracted downwardly rearwardly by a preloader apparatus (not shown in FIG. 6) from a position of ordinary vehicle running shown by solid lines in FIG. 6 to a retracted position shown by two-dot chain lines in FIG. 6. The webbing 12 is tightened by the preloader apparatus, and thus initial restriction of a passenger is enhanced.

Figure 1:
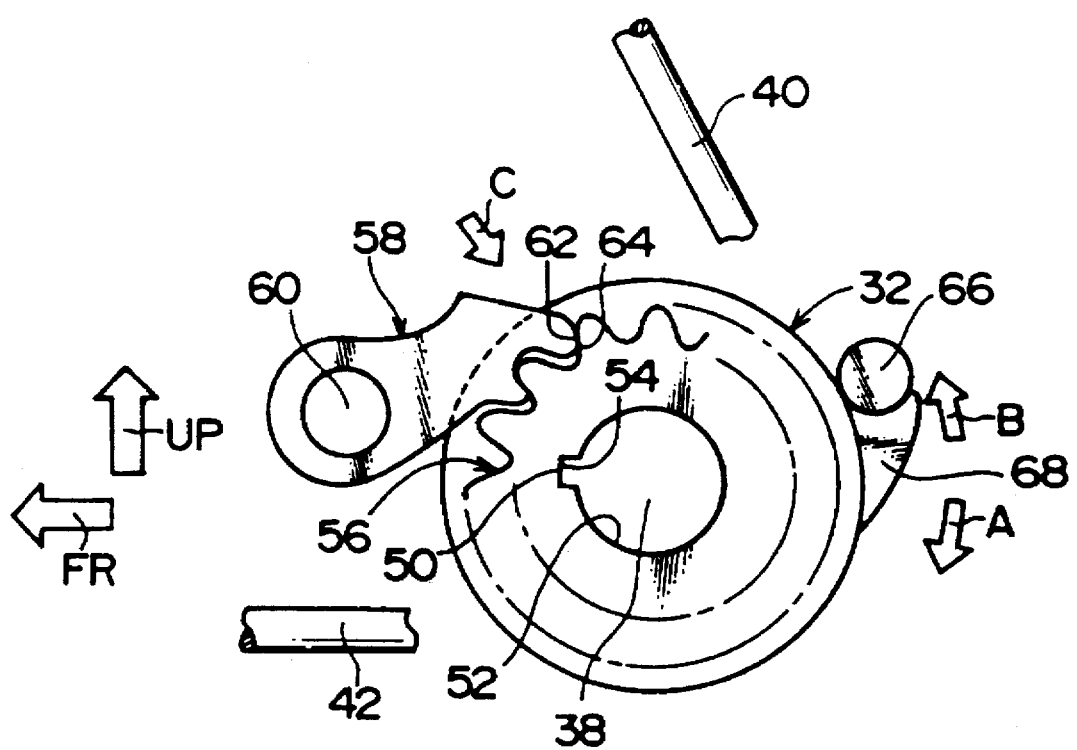
FIG. 1 is an illustrative view of a preloader apparatus of a first embodiment of the present invention depicted at a buckle-protracted position (ordinary position) as viewed from a widthwise direction of a vehicle.
Figure 2:
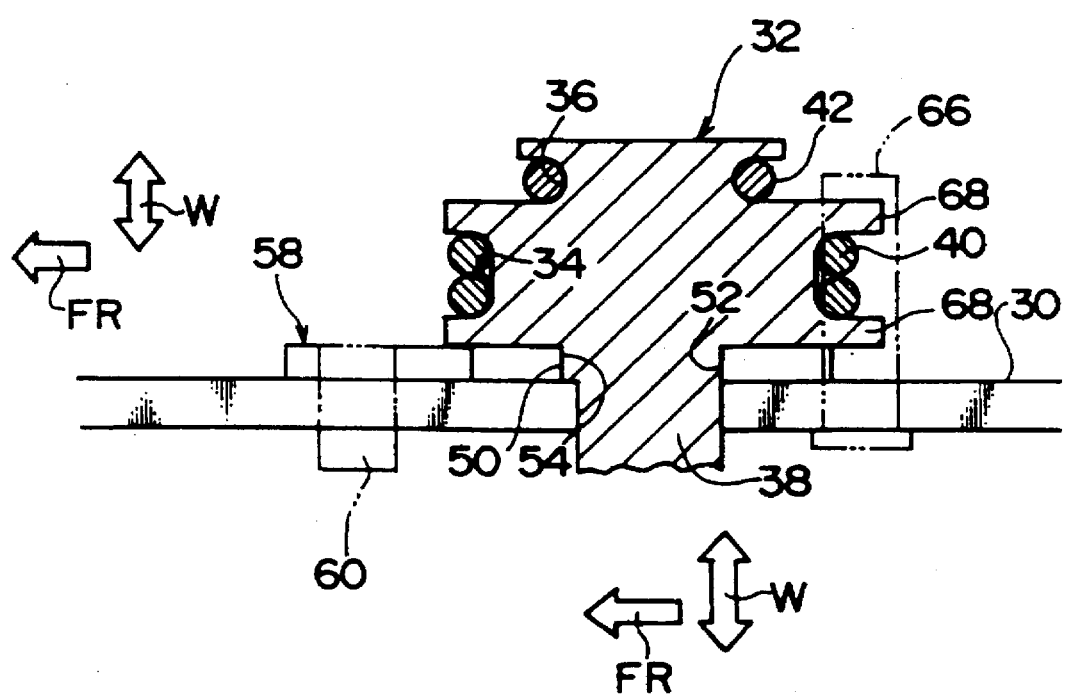
FIG. 2 is a lateral cross-sectional view of the preloader apparatus of the first embodiment as viewed from a position over the vehicle.
Figure 3:
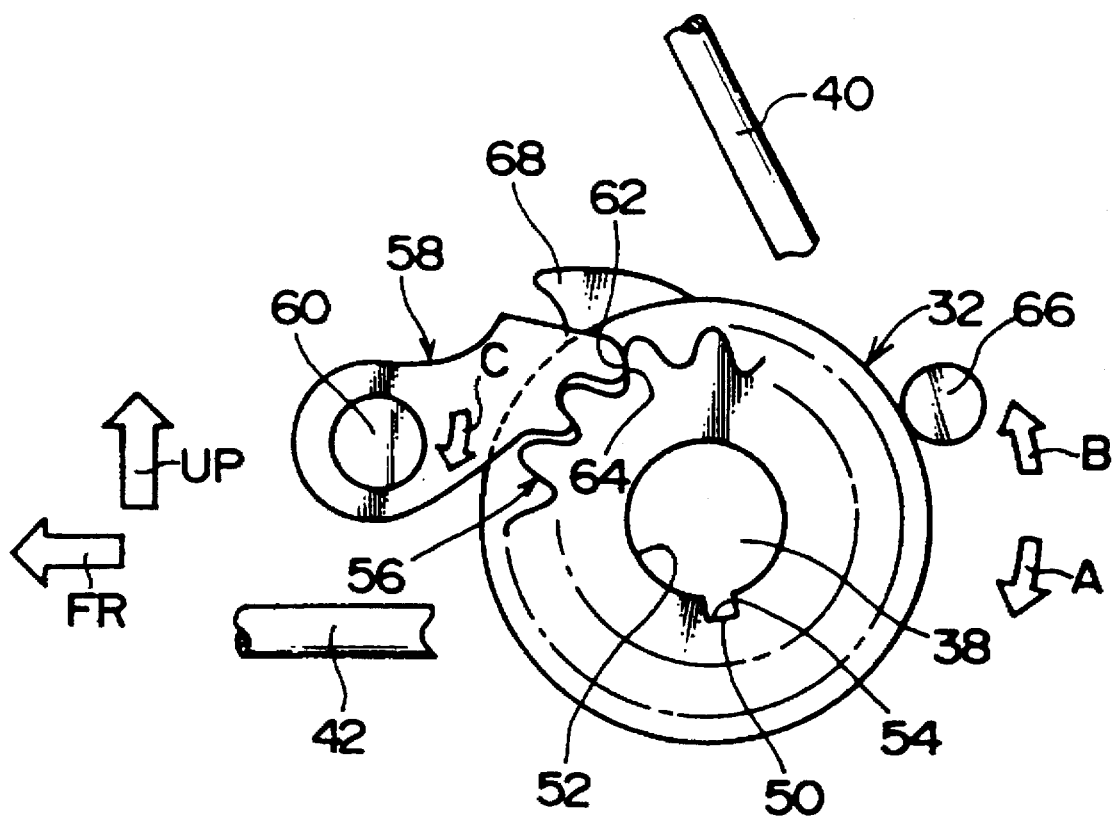
FIG. 3 is an illustrative view of the preloader apparatus of the first embodiment depicted at a buckle-retracted position, corresponding to FIG. 1.
Figure 5:
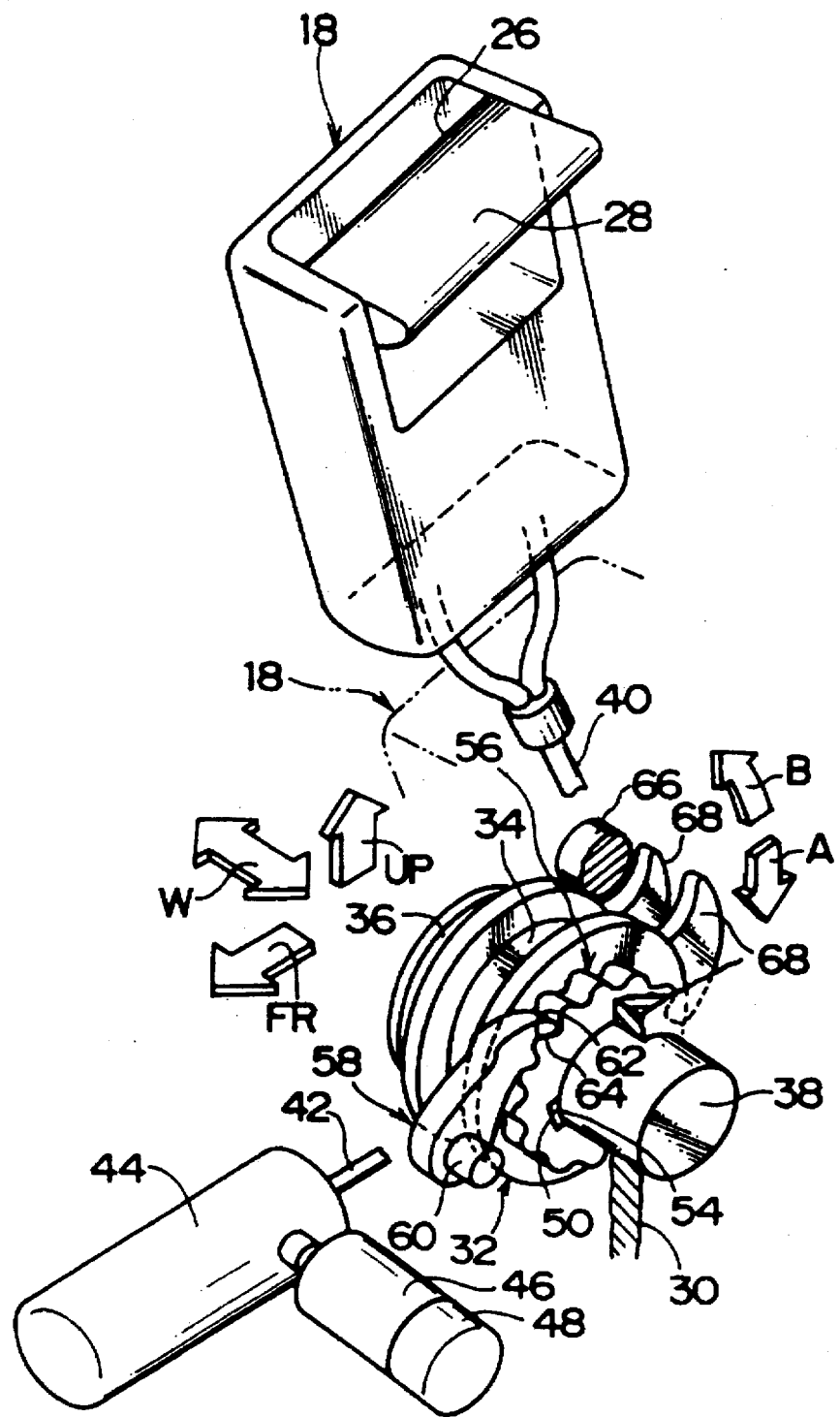
FIG. 5 is a perspective view showing the preloader apparatus of the first embodiment.

As shown in FIGS. 1, 2 and 5, the preloader apparatus is provided with a drum 32 as a moving member. The drum 32 is provided with a drum shaft 38 formed integrally with the drum 32 and extending horizontally. The drum shaft 38 is rotatably supported by a base 30 provided uprightly on a body (see FIGS. 2 and 5). The drum 32 is rotatable using the drum shaft 38 as a center.

A first winding groove 34 and a second winding groove 36 are coaxially formed on circumferential surfaces of the drum 32. The first winding groove 34 is located on a side of the base 30, around which a first wire 40 is wound.

As shown in FIG. 5, one end of the first wire 40 is connected to a bottom portion of the buckle 18. The other end of the first wire 40 is secured to a groove bottom of the first winding groove 34. When the drum 32 rotate in a clockwise direction in FIG. 1 (a direction of buckle retraction shown by an arrow A), the first wire 40 is wound by the first winding groove 34. Thus the buckle 18 is retracted (see the retracted position shown by the two-dot chain lines in FIG. 6).

On the other hand, when the drum 32 rotates in a counterclockwise direction in FIG. 1 (a direction of buckle protraction shown by an arrow B), the first wire 40 is drawn from the first winding groove 34. Thus the buckle 18 can be protracted.

The second winding groove 36, which is located on a side opposite to the base 30, has a diameter smaller than that of the first winding groove 34 (see FIG. 2). A second wire 42 is wound around the second winding groove 36. One end of the second wire 42 is connected to a piston (not shown) contained in a cylinder 44 (see FIG. 5). The other end of the second wire 42 is secured to a groove bottom of the second winding groove 36. As shown in FIG. 5, an inflater 46 is connected to the cylinder 44.

When an acceleration sensor 48 senses quick deceleration of the vehicle, the inflater 46 generates gas. The generated gas is supplied to the interior of the cylinder 44. Thus an unillustrated piston moves, and the second wire 42 is pulled frontwardly in the vehicle. At this time, the drum 32 rotates in a direction of buckle retraction, and the buckle 18 is retracted to the retracted position (the position shown by the two-dot chain lines in FIGS. 5 and 6).

The drum shaft 38 of the drum 32 is cylindrical. An external gear 56, which has external teeth 62 as teeth for engagement, is provided on the drum shaft 38 by being fitted between the drum 32 and the base 30. A projection 50 is provided on the drum shaft 38 to make projection radially outwardly. The projection 50 is made brittle, for example, by using a material having low strength only at the corresponding portion, or by adjusting its thickness. A depression 54 corresponding to the projection 50 is formed in the external gear 56 at a circumferential portion of a circular drum shaft hole 52 through which the shaft 38 passes. The projection 50 engages with the depression 54, and thus the external gear 56 can rotate integrally with the drum 32.

A pawl 58 is provided corresponding to the external teeth 62 of the external gear 56. One end of the pawl 58 is rotatably supported by the base 30 through a pawl shaft 60 parallel to the drum shaft 38. The other end of the pawl 58 is allowed to extend over. This extending forward end serves as a meshing portion 64 for meshing (engaging) with the external tooth 62. The pawl 58 is swingable using the pawl shaft 60 as a center. For example, an unillustrated torsion coil spring is fitted thereto. The unillustrated torsion coil spring energizes the pawl 58 to rotate in a clockwise direction in FIG. 1 (direction shown by an arrow C). Thus the meshing portion 64 of the pawl 58 is urged so that it meshes with the external tooth 62.

When the external gear 56 rotates in the clockwise direction, the pawl 58 can successively mesh with the external teeth 62 by repeating swinging movement. Thus the external gear 56 is permitted to rotate in the clockwise direction. Therefore, the drum 32 can rotate in a direction of buckle retraction.

On the other hand, when the external gear 56 rotates in a direction of buckle protraction, a rotation-urging force in a direction to allow the meshing portion 64 to mesh with the external tooth 62 is applied to the pawl 58, and the external tooth 62 catches the meshing portion 64. Thus the external gear 56 is prevented from rotation in the direction of buckle protraction. Therefore, the drum 32 is prevented from rotation in the direction of buckle protraction.

As shown in FIGS. 1–5, the base 30 is provided with a cylindrical stopper 66 extending in parallel to the axial direction of the drum shaft 38 along the outer circumference of the drum 32. Projections 68 are integrally formed on the outer circumference of the drum 32 corresponding to the stopper 66. When the buckle 18 is protracted, the projections 68 abut against the stopper 66. Thus the drum 32 is prevented from further rotation in the direction of buckle protraction. The projections 68 are separated from the stopper 66 in accordance with rotation of the drum 32 in the direction of buckle retraction from the ordinary protracted position of the buckle 18.

The drum 32 is energized to rotate in the direction of buckle protraction so that the projections 68 abut against the stopper 66.

In operation, the tongue plate 14 is inserted into the tongue plate insertion hole 26 of the buckle 18 to make engagement, and thus the webbing 12 is installed. When the engagement between the tongue plate 14 and the tongue plate insertion hole 26 of the buckle 18 is canceled by depressing the cancel button 28, the installation of the webbing 12 can be canceled.

Upon quick deceleration of the vehicle, the second wire 42 is pulled, the drum 32 rotates in the direction of the buckle retraction (see FIG. 3), and the buckle 18 is retracted to the retracted position through the first wire 40. Thus the webbing 12 is tightened. The meshing portion 64 of the pawl 58 meshes with the external tooth 62 of the external gear 56, and the external gear 56 is prevented from rotation in the direction of buckle protraction.

After that, the pressure of the gas applied to the piston decreases. Thus the buckle-retracting force decreases. A passenger is going to make inertial movement, and a tensile force is applied to the webbing 12, because the buckle-retracting force decreases. When the tensile force applied to the webbing 12 is smaller than the webbing-protracting force, a force F corresponding to a difference therebetween acts on the projection 50 and the depression 54 as the connecting portion between the drum 32 and the external gear 56. Therefore, the projection 50 opposes the force F as long as the projection 50 confronts the force F (before the projection 50 is broken by the action of the force F on the projection 50), and thus the drum 32 does not rotate in the direction of buckle protraction.

When the force F arrives at a predetermined force, the projection 50 is broken. When the projection 50 is broken, the projection 50 is left in the depression 54 (as shown by a latticed pattern in FIG. 4). Thus the drum shaft 38 of the drum 32 can make relative sliding rotation in the drum shaft hole 52. Accordingly, the drum 32 rotates in the direction of buckle protraction, and the buckle 18 can be protracted.

Figure 4:
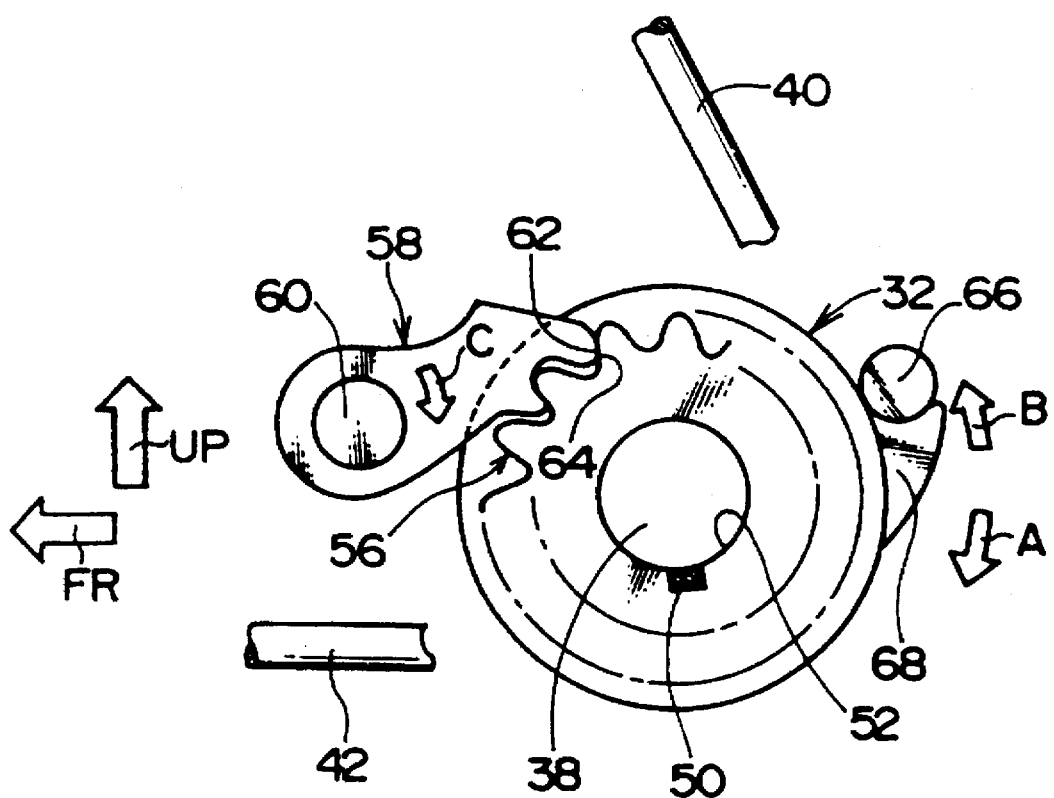
FIG. 4 is an illustrative view of the preloader apparatus of the first embodiment depicted in a state of being restored to the buckle-protracted position, corresponding to FIG. 1.

After that, the buckle-protracting force rotates the drum 32 in the direction of buckle protraction, however, the projections 68 abut against the stopper 66 (see FIG. 4). Thus the buckle 18 is restored to the protracted position, and the drum 32 is prevented from rotation in the direction of buckle protraction. Therefore, the buckle 18 cannot be further protracted because the projections 68 abut against the stopper 66.

Second Embodiment

Next, a second embodiment will be explained with reference to FIGS. 7–9. The second embodiment generally has similar arrangements to those of the first embodiment, for example, in that the projections 68 abut against the stopper 66 at the protracted position of the buckle 18 (see FIG. 9) to prevent the buckle 18 from further protraction.

In this embodiment, a drum shaft 102 has a rectangular column-shape, and a drum shaft hole 110 is also a rectangular or square hole. Therefore, an external gear 104 can rotate integrally with a drum 106.

External teeth 108 of the external gear 104 serve as brittle portions. The external teeth 108 are made brittle by using a material having low strength only at the corresponding portions, or by adjusting their thickness.

Figure 7:
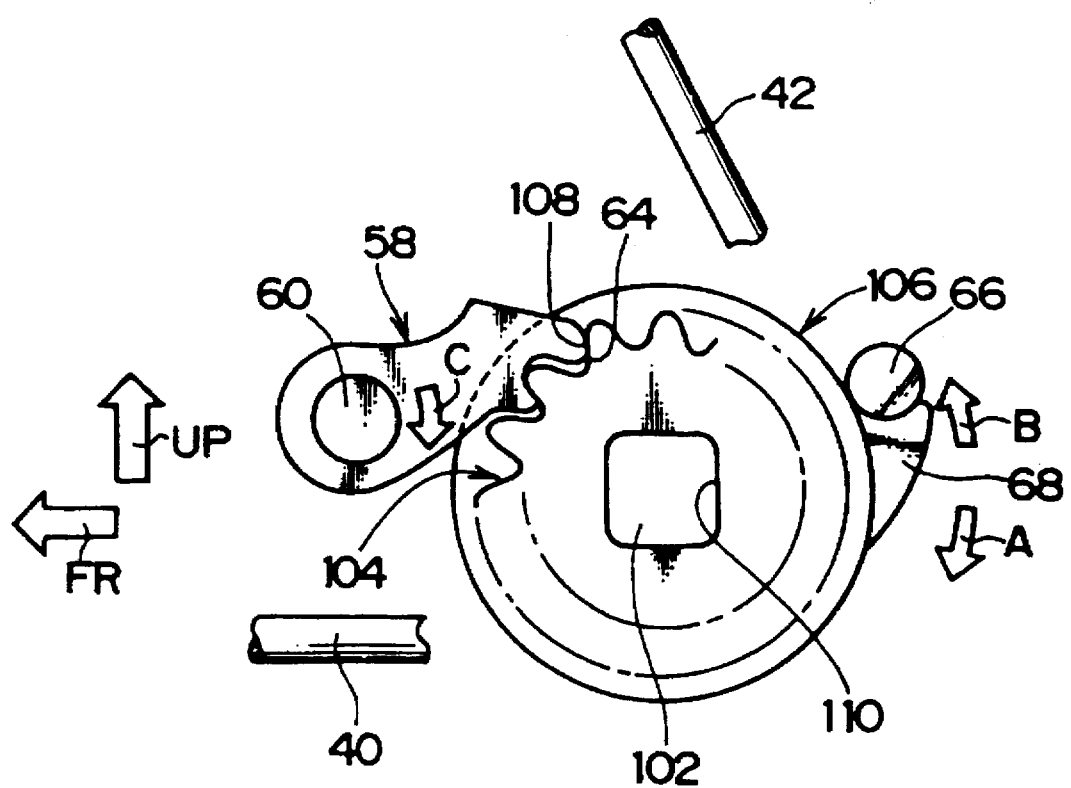
FIG. 7 is an illustrative view of a preloader apparatus of a second embodiment depicted at a buckle-protracted position (ordinary position) as viewed from a widthwise direction of a vehicle.
Figure 8:
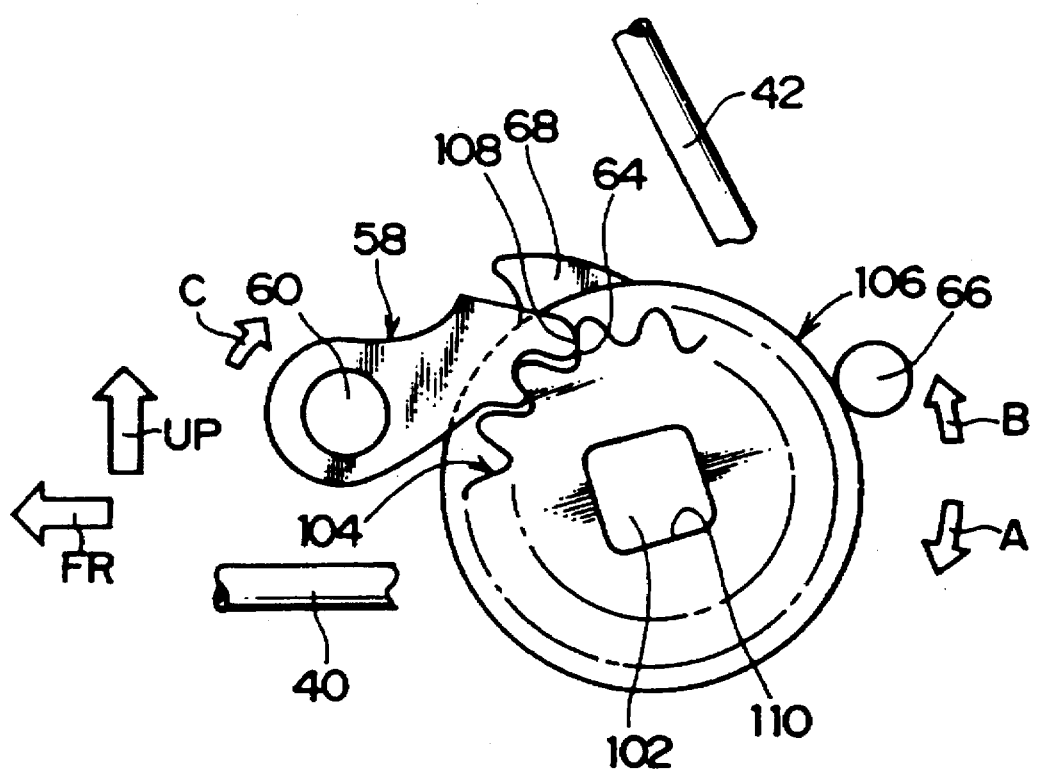
FIG. 8 is an illustrative view of the preloader apparatus of the second embodiment depicted an a buckle-retracted position, corresponding to FIG. 7.

In operation, the second wire 42 is pulled upon quick deceleration of a vehicle, the drum 32 rotates from a position shown in FIG. 7 in a direction of buckle retraction (see FIG. 8), and the buckle 18 is retracted to a retracted position through the first wire 40. After that, when the buckle-retracting force decreases and becomes smaller than the buckle-protracting force, a force F corresponding to a difference therebetween is applied to the external tooth 108 and the meshing portion 64 of the pawl 58. The external tooth 108 maintains the engagement with the meshing portion 64 of the pawl 58 as long as the external tooth 108 opposes the force E, and the external gear 104 is prevented from rotation by the pawl 58. Thus the drum 32 is also prevented from rotation.

Figure 9:
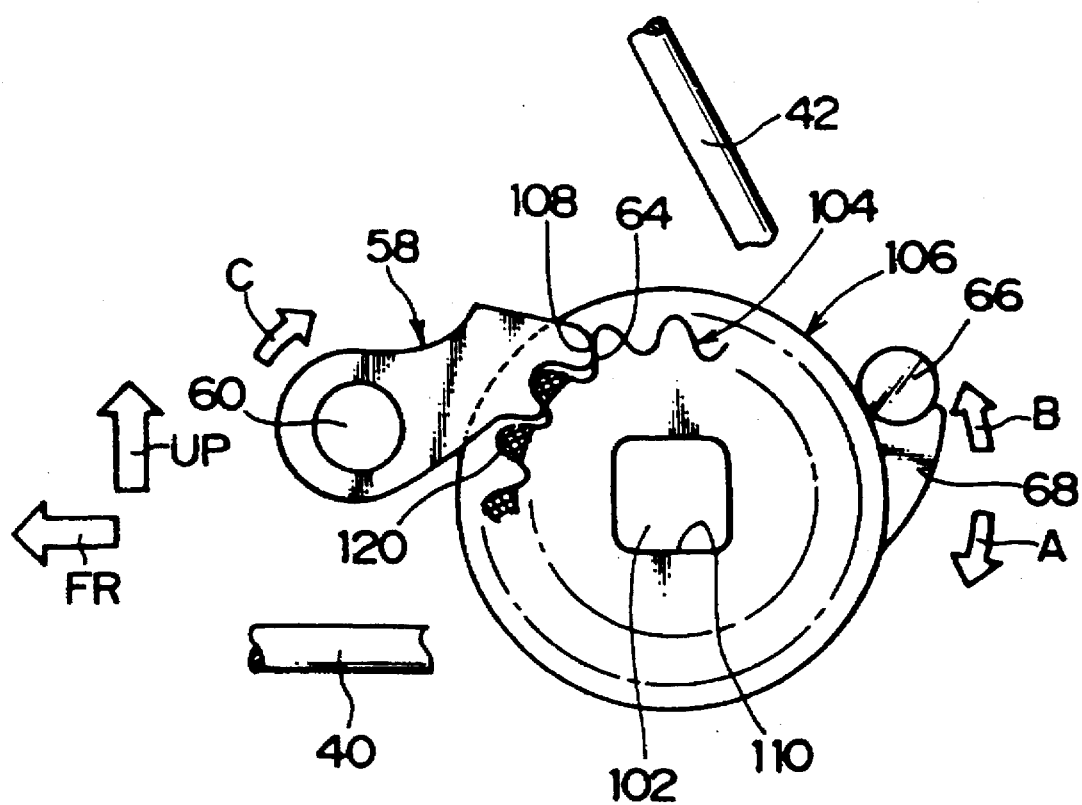
FIG. 9 is an illustrative view of the preloader apparatus of the second embodiment depicted in a state of being restored to the buckle-protracted position, corresponding to FIG. 7.
Figure 10:
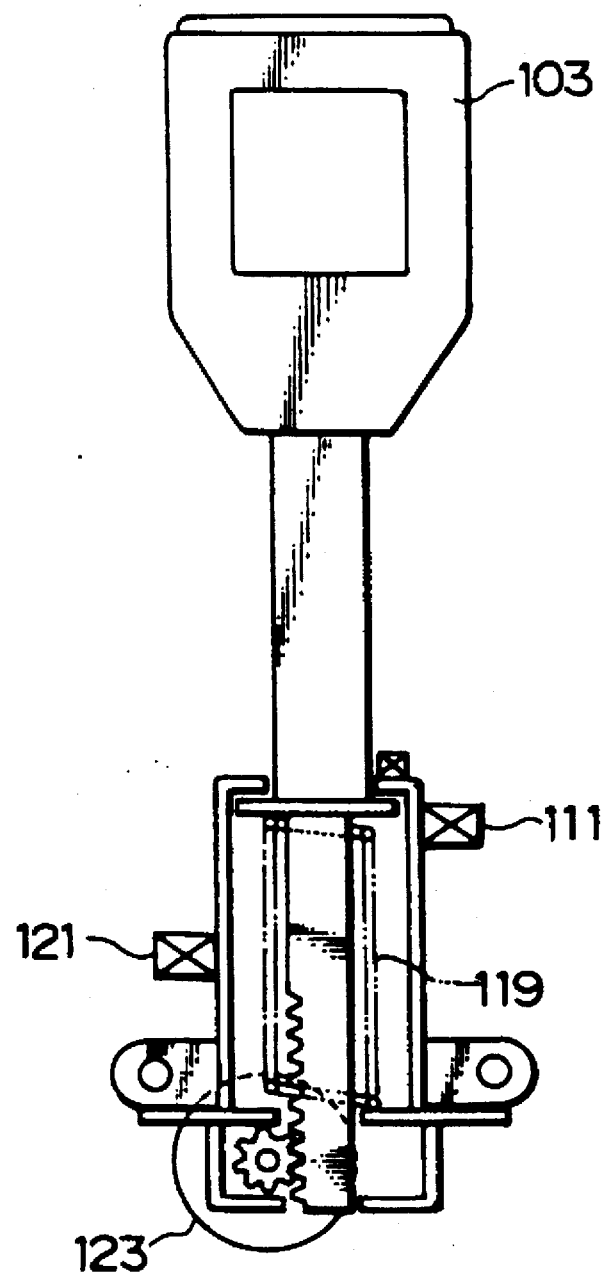
FIG. 10 is a schematic view of a structure of an electronic preloader apparatus relevant to the prior art.
Figure 11:
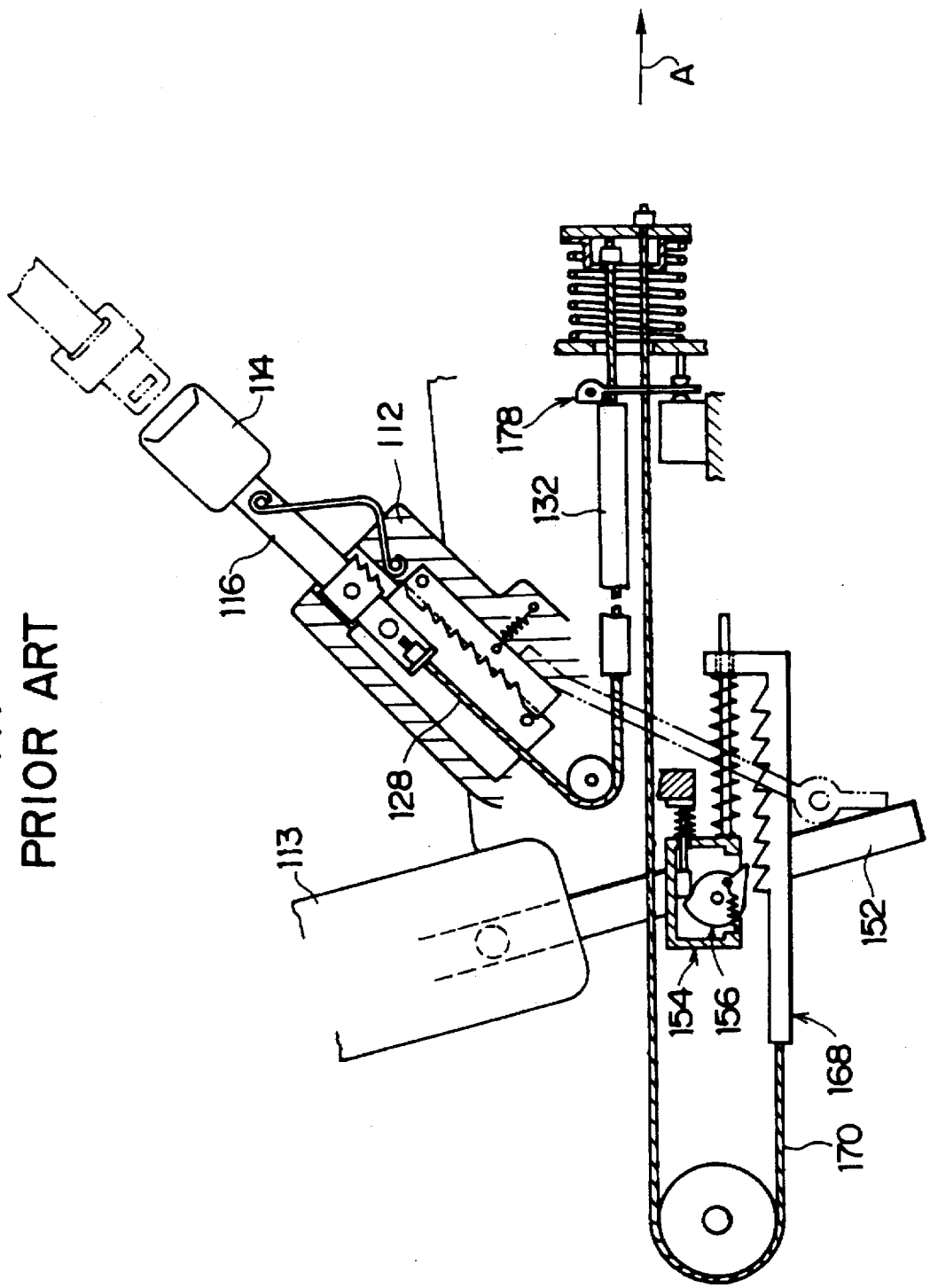
FIG. 11 is a schematic view of a structure of a mechanical preloader apparatus relevant to the prior art.

When the force F arrives at a predetermined force, the external tooth 108 is broken at its root, and the engaging portion with respect to the meshing portion 64 is deleted (deleted portions 120 as forward ends of the external teeth 108 shown by latticed patterns in FIG. 9). Thus the pawl 58 cannot prevent the external gear 104 from rotation in the direction of buckle protraction, and it meshes with the next external tooth 108. The tooth 108 will be also broken, followed by successive breakage of the external teeth 108. Thus the external gear 104 can rotate in the direction of buckle protraction.

As described above, according to the preloader apparatus of each of the embodiments, the buckle 18 is retracted upon quick deceleration of the vehicle, and the webbing 12 is tightened to make it possible to certainly perform initial restriction of a passenger. After that, the buckle 18 is restored to an ordinary protracted position to enable operation of the cancel button 28 at the same position as that in an ordinary state. Thus it is possible to contemplate the improvement in operability of the cancel button 28.

The present invention is not limited to each of the embodiments described above, and various modifications are possible. The projection 50 is used as the brittle portion in the first embodiment, while the external tooth 108 is used as the brittle portion in the second embodiment. However, various components may be used as the brittle portion. For example, the meshing portion of the pawl can be used as the brittle portion in the second embodiment. Alternatively, a plurality of projections 50 may be provided.

In each of the embodiments described above, the moving member is constructed by the drum, and the operating member is constructed by the external gear, wherein the wires are wound around the drum so that the buckle is retracted with the rotation of the drum through the first and second wires. However, there is no limitation thereto. Namely, one wire may be used as the wire without dividing into the two of the first and second wires. Those wound around the drum are not limited to the wire. The moving member is also not limited to the drum. The operating member is also not limited to the external gear, which may be an internal gear. The shape of the tooth is also optional, and those other than the gear can be used.

What is claimed is:

1. A preloader apparatus for retracting a buckle from an ordinary protracted position to a retracted position for tightening a webbing when a vehicle suddenly decelerates, the buckle having an engaging portion for engaging with a tongue plate for attaching and detaching the webbing, and a cancel operation portion for cancelling the engagement, said preloader apparatus comprising:

a brittle portion which prevents the buckle from being protracted by opposing a buckle-protracting force after the buckle is retracted to the retracted position and before the buckle-protracting force arrives at a predetermined force, and which is broken after the buckle-protracting force arrives at the predetermined force to permit the buckle to be protracted; and a prohibiting means for positively prohibiting the buckle from being further protracted beyond the ordinary protracted position of the buckle.

2. The preloader apparatus according to claim 1, wherein said brittle portion is formed at a connecting portion between a moving member by which the buckle is retracted in accordance with movement in one direction and the buckle is protracted in accordance with movement in an opposite direction, and an operating member which is connected to the moving member and moves integrally with the moving member.

3. The preloader apparatus according to claim 2, wherein said brittle portion permits the moving member to move in the opposite direction when it is broken.

4. The preloader apparatus according to claim 2, wherein said brittle portion further comprises a lock member which engages with the operating member, permits the operating member to move in one direction, and prevents the operating member from moving in an opposite direction.

5. The preloader apparatus according to claim 4, wherein said brittle portion permits the moving member to move in the opposite direction when it is broken.

6. The preloader apparatus according to claim 2, wherein said prohibiting means prohibits the buckle from being further protracted at the protracted position of the buckle by preventing the moving member from moving in the opposite direction.

7. The preloader apparatus according to claim 2, wherein said moving member is a drum, and said operating member is an engaging tooth member having an engaging tooth for engaging with the drum at its circumferential portion.

8. The preloader apparatus according to claim 7, wherein said engaging tooth member is a projection provided on the operating member for engaging with the drum.

9. The preloader apparatus according to claim 8, wherein a plurality of projections are provided.

10. The preloader apparatus according to claim 7, wherein a wire is wound around the drum, and the buckle is retracted in accordance with rotation of the drum by pulling the wire.

11. The preloader apparatus according to claim 1 wherein said brittle portion is formed at an engaging portion between an operating member which moves integrally with a moving member by which the buckle is retracted by movement in one direction and the buckle is protracted by movement in an opposite direction, and a lock member which engages with the operating member, permits the operating member to move in one direction, and prevents the operating member from moving in an opposite direction.

12. The preloader apparatus according to claim 11, wherein said brittle portion cancels the engagement between the operating member and the lock member when it is broken, and permits the operating member to move in the opposite direction.

13. The preloader apparatus according to claim 11, wherein said prohibiting means prevents the buckle from being further protracted at the protracted position of the buckle by preventing the moving member from moving in the opposite direction.

14. The preloader apparatus according to claim 11, wherein said moving member is a drum, and said operating member is an engaging tooth member having engaging teeth for engaging with the drum at its circumferential portion.

15. The preloader apparatus according to claim 14, wherein said engaging tooth member is an external gear.

16. The preloader apparatus according to claim 15, wherein said lock member is a pawl for meshing with the external gear.

17. The preloader apparatus according to claim 14, wherein a wire is wound around the drum, and the buckle is retracted in accordance with rotation of the drum by pulling the wire.

* * * * *